United States Patent [19]

Jones

[11] Patent Number: 5,412,730
[45] Date of Patent: May 2, 1995

[54] ENCRYPTED DATA TRANSMISSION SYSTEM EMPLOYING MEANS FOR RANDOMLY ALTERING THE ENCRYPTION KEYS

[75] Inventor: Michael F. Jones, Nashua, N.H.

[73] Assignee: Telequip Corporation, Hollis, N.H.

[21] Appl. No.: 872,674

[22] Filed: Apr. 23, 1992

Related U.S. Application Data

[63] Continuation-in-part of Ser. No. 418,178, Oct. 6, 1989, abandoned.

[51] Int. Cl.$^6$ .............................................. H04L 9/00
[52] U.S. Cl. ........................................ 380/46; 380/9; 380/21; 380/29; 380/49
[58] Field of Search .................. 380/9, 20, 21, 43, 44, 380/49, 50, 18, 46, 29

[56] References Cited

U.S. PATENT DOCUMENTS 4,809,327  2/1989  Shima ..................................... 380/44
4,876,716  10/1989  Okamoto ............................... 380/21
4,985,919  1/1991  Naruse et al. ......................... 380/9 X Primary Examiner—Bernarr E. Gregory
Attorney, Agent, or Firm—Allegretti & Witcoff, Ltd.

[57] ABSTRACT

A modem suitable for transmitting encrypted data over voice-grade telephone line. The modem is implemented by the combination of integrated circuit components including a microprocessor, a serial communications controller which communicates with connected data terminal equipment, and a modulator/demodulator for translating between voice band tone signals and digital data. Pseudo random number generators are employed at both the transmitting and receiving stations to supply identical sequences of encryption keys to a transmitting encoder and a receiving decoder. An initial random number seed value is made available to both stations. The random number generators are advanced at times determined by predetermined characteristics of the data being transmitted so that, after transmission has taken place, the common encryption key can be known only to the transmitting and receiving stations.

2 Claims, 5 Drawing Sheets

Microfiche Appendix Included
(2 Microfiche, 119 Pages)

ENCRYPTED DATA TRANSMISSION SYSTEM EMPLOYING MEANS FOR RANDOMLY ALTERING THE ENCRYPTION KEYS

BACKGROUND OF THE INVENTION

This is a continuation-in-part of application Ser. No. 07/418,178 filed on Oct. 6, 1989.

A computer program listing is submitted herewith as a microfiche appendix having 119 frames on 2 microfiche.

This invention relates to data transmissions systems and, more particularly, to systems for transmitting enciphered data.

Data encryption provides security for transmitted data by scrambling the "clear text" data into "cipher text". Typically, the transmitted data is scrambled in a manner selected by a unique key value (such as a 56-bit binary number) and unscrambled, at the receiving station, by a reverse process that requires the same key value be known.

For increased data security, the encryption key value may be changed frequently to further reduce the likelihood that an unauthorized party may decipher the data. In such systems, new key values are sent at intervals from the transmitting station to the receiving station. The keys may be generated by a random number generator located at the transmitting end, encrypted in accordance with the currently active key, and transmitted along with the other data. At the receiving station, the encrypted key is extracted from the data stream, deciphered, and substituted at a designated time for the prior key. In such a system, if any of the transmitted keys are deciphered, the successive keys may be deciphered as well, so that all of the transmitted information may be decoded.

In accordance with a principle feature of the present invention, pseudo-random number generators are employed at both the transmitting and receiving stations to supply a like sequence of encryption keys to both the encryptor and decryptor, without these keys being transmitted in any form over the transmission facility. In accordance with the invention, to permit the two stations to communicate, each supplied in advance with a random number seed value which exclusively determines the numerical content of the sequence of numeric values generated by each of the two pseudo-random generators. In order that the two generators switch from one output key value to the next in synchronism, means are employed at both the transmitting and receiving stations to monitor the flow of transmitted data and to advance the random number generator each time the transmitted data satisfies a predetermined condition.

The monitoring function can advantageously be performed simply by counting the units of data being transmitted and by advancing each pseudo-random key generator each time the count reaches an agreed-upon interval number. In this way, no additional synchronization information needs to be added to the data stream. For even greater security, the interval number (which must be reached before the key is switched) may itself be a changing value generated by a random number generator, so that the duration during which a given key is active changes from key to key at times which are predictable only by the authorized recipient.

In accordance with still another feature of the invention, different random number seed values and different interval numbers (or different random number seed values for the generator of the interval numbers) may be associated with each of a plurality of remote locations with whom secured communication is required, so that the data on any given link is decipherable only by the authorized receiving station, even though other stations may have identical communication and decryption hardware.

As a consequence of the foregoing feature, the invention may be used to advantage to control communications within a network. A key memory is provided which permits a unique serial number identifying a remote unit to be stored along with the current encryption key value, the serial number and key value being stored on command from the local unit or by being downloaded from a remote unit which serves as the host or network supervisor. Once the host station has supplied the initial seed value keys to the units forming the two terminal locations for a given link and transmission over that link begins, the host is no longer "knows" the encryption key values since they are dependent upon the nature of the transmissions over the link. Consequently, link security cannot be compromised even by an "insider" who is in possession of the initial key values supplied by the host.

As contemplated by still another feature of the invention, the encryption and decryption may advantageously be accomplished within a modem unit which also performs data compression and decompression, as well as error-handling functions. Advantageously, the compression, encryption and error-coding functions may all be performed (in that sequence) at the transmitting station by the same processor, while a like processor at the receiving end is suitably programmed to provide, in sequence, the error control, decryption, and decompression functions.

The principles of the invention may be applied to advantage in terminals connected as part of a secured communication network operating under central control. A key memory at each terminal may be loaded, by a secure communication from the central control, with encryption keys associated with other terminals with which secured communication is authorized. In this way, the central control can selectively permit or prohibit any terminal from decoding communications from any other terminal on a dynamically changing basis.

This and other features and advantages of the invention may be more clearly understood by considering the following detailed description of specific embodiments of the invention.

BRIEF DESCRIPTION OF THE DRAWINGS

In the course of the detailed description to follow, reference will frequently be made to the attached drawings, in which.

DESCRIPTION OF THE PREFERRED EMBODIMENT

Figure 1:
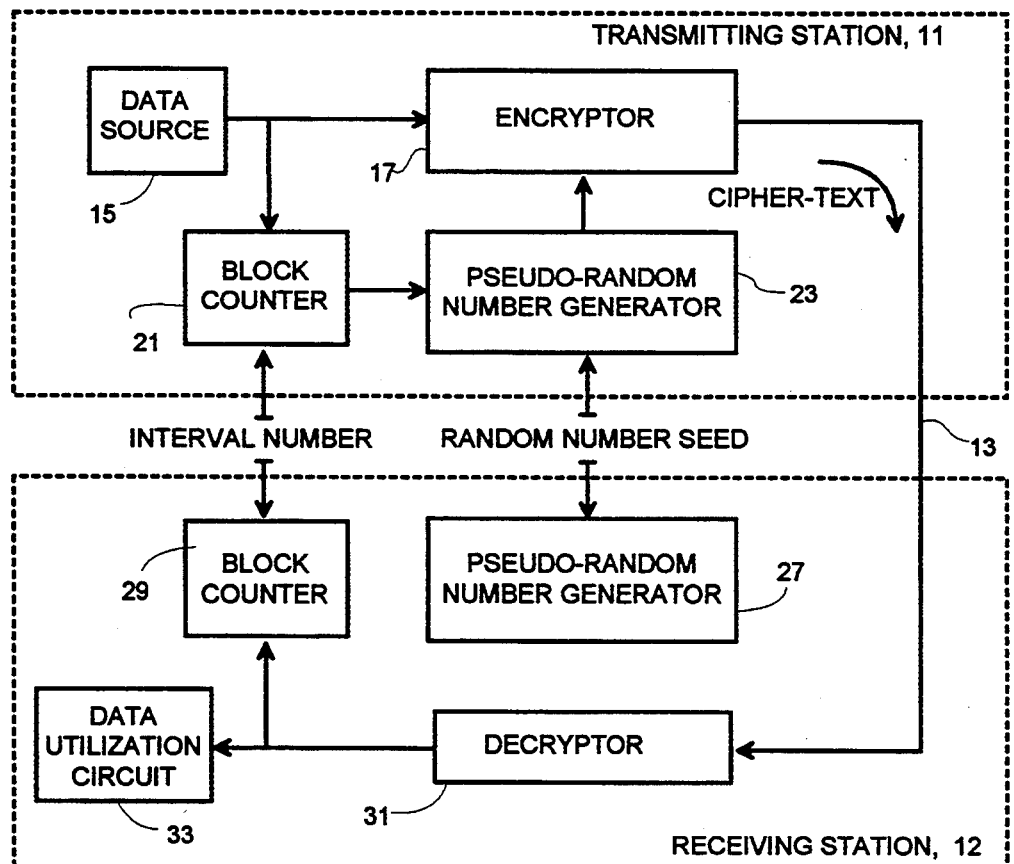
FIG. 1 is a functional block diagram illustrating the basic signal processing steps which embody the invention.

FIG. 1—Basic Processing

FIG. 1 illustrates the manner in which the data being transmitted is subjected to a sequence of signal processing steps as contemplated by the present invention. These processing steps are executed at a transmitting station 11 and at a receiving station 12 connected to opposite ends of a communications channel 13.

At the transmitting station 11, a source of data 15 supplies a serial data stream to the data input of an encryptor 17. The data from source 15 may take substantially any form, such as a file of text characters, each encoded as a 8-bit byte, or a file of numerical binary information expressed in 16-bit or 32-bit words. A block counter 21 monitors the stream of data from the source 15 and generates an "advance signal" each time the data meets a predetermined condition. Advantageously, the block counter 21 may simply count the number of bytes (characters), words or blocks of data being transmitted, compare the current count with a predetermined 37 interval number" and produce an advance signal each time the current count reaches the interval number (at which time the current count is reset to 0).

The advance signal produced by block counter 21 is supplied to the advance input of a pseudo-random number generator 23 which supplies a sequence of encryption key values to the key input of the encryptor 17. The content of the key sequence is predetermined by the combination of (1) the internal makeup of the generator 23 and by (2) a supplied random number seed value which initializes the generator 23. The generator 23 responds to each advance signal from block counter 21 by changing its output to the next successive encryption key value. Thus, for example, the combination of counter 21 and generator 23 operate to change the encryption key each time total number of bytes transmitted is an exact multiple of the predetermined interval number.

The encryptor 17 translates fixed length segments of the data from source 15 ("clear text") into fixed-length "cipher text" output segments, each segment translation taking place in a manner uniquely determined by the encryption key currently supplied by the pseudo-random number generator 23. The encryptor 17 (and the decryptor 19, to be discussed) may advantageously employ the accepted NBIS Data Encryption Standard (DES), which codes and decodes data in 64-bit (8 byte) units in accordance with a 56-bit key. The block counter 21 need not supply advance signals on boundaries between encryption units, nor does the generator 23 need to provide new key value precisely on encryption unit boundaries. Instead, the encryptor 17 may buffer the new keys temporarily, using it for the first time on the next successive encryption unit of data.

At the receiving station 12, the incoming cipher text is applied to the data input of the decryptor 31 whose key input is connected to receive a sequence of keys from the pseudo-random number generator 27. The clear text output from the decryptor 31 is applied to a data utilization device 33 and is monitored by a block counter 29 which supplies advance signals to the number generator 27. Block counter 29 performs the identical function as that performed by the counter 21 at the transmitting station 11 and hence supplies advance signals to the generator 27 at precisely the same times (relative to the data stream) that counter 21 advances generator 23. Each time the current count reaches the interval number, the pseudo-random number generator 27 is advanced. Since the internal makeup of random number generator 27 is identical to that of generator 23, and since it is supplied with the same seed value, and since block counter 29 is supplied with the same interval number value as that supplied to the block counter 21, exactly the same sequence of keys will be supplied to the random number generators 23 and 27, and the keys will change at precisely the same time (relative to the data stream) to accurately decipher the transmitted data.

Of course, in order for the receiving station to successfully decipher the incoming cipher text, the receiving station 12 must be provided (in some fashion) with both the correct seed value and the correct interval number. These values are supplied to the receiving station in advance of the transmission by any secure means. However, once the receiver possesses these values, no further information is required to decipher the transmissions. No key values, key verification values, or key synchronization signals need accompany the transmitted ciphered text to control or coordinate the encryption or decryption processing, even though the encryption keys are continuously changing to enhance security.

FIG. 2—Hardware

Figure 2:
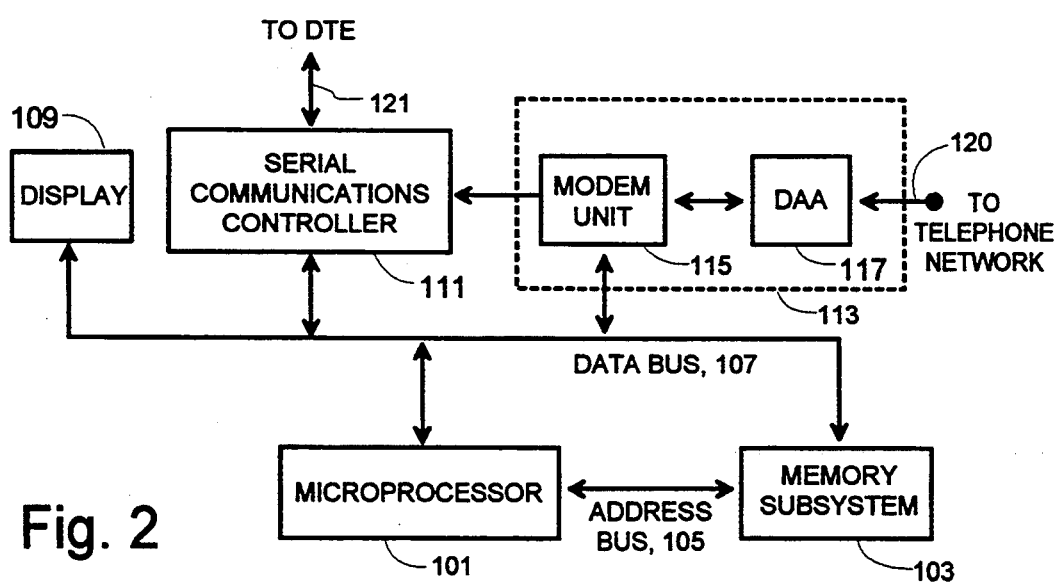
FIG. 2 is a hardware block diagram which shows a modem apparatus of the type contemplated by the invention.

The principles of the present invention may be advantageously implemented in a data communications modem having a hardware architecture of the type generally depicted in FIG. 2 of the drawings. As shown, the modem operates under the supervisory control of a microprocessor 101 such as the model 80188 microprocessor available from Intel Corporation. The instructions and data operated on by the microprocessor 101 are stored in a memory subsystem 103 which is composed of both read-only memory (advantageously implemented as EPROM memory) and random access memory (RAM). Memory subsystem 103 is coupled to the microprocessor 101 by a memory address bus 105 and a data bus 107.

The data bus 107 also provides a data path to three peripheral devices: a display 109, a serial communications controller (SCC) 111, and a modem module 113. The SCC 111 may take the form of an integrated circuit such as the model 82530 controller manufactured by Intel Corporation. The modem module 113 may be constructed using a modem unit 115, model R9696 chip set available from Rockwell International Corporation, a cooperating set of integrated circuits capable of performing trellis-coded modulation and demodulation meeting the V.32 9600 baud communications protocol standard, as well as the V.22 bis standard, and further includes analog/digital conversion circuits which provide an interface to a direct access adapter (DAA) 117. The adapter 117 may take the form of a type CH1828 integrated circuit DAA available from Cermetek Microelectronics, Inc.

The modem hardware shown in FIG. 2 is used at both ends of the communications channel. At the transmitting end, data to be transmitted is supplied by the connected data terminal equipment (DTE) via the serial port 121 (e.g., a RS-232c or RS-422 standard port). The asynchronous serial interface with the DTE typically operates under the combined control of the microprocessor 101 and the SCC 111 in accordance with a standard interface protocol (e.g., the V.42 standard protocol). The DTE (data terminal equipment) may be any terminal or computer adapted to communicate via this standard port using the selected serial protocol.

The encryption/decryption processing is essentially "transparent" to the DTE; that is, the data is enciphered and deciphered without effecting the content of the data sent by or received by the DTE. However, it is desirable to permit the connected DTE to send commands (such as extensions to the standard "AT command set") which will control encryption processing, turning encryption ON and OFF, and accepting seed values and interval numbers entered as "passwords" directly from the connected DTE.

Data signals from the DTE which are to be transmitted are encrypted as described above and shown in FIG. 1, the random number seed values and the interval number values being pre-supplied to the microprocessor 101 and stored in memory subsystem 103. At the receiving end, the modem module 113 shown in FIG. 2 receives the incoming data (typically as a 9600 baud trellis-coded signal adapted for transmission over the analog telephone link) and converts that incoming signal into data which is processed by microprocessor 101 and supplied via the SCC 111 to the connected DTE. In the receiving mode, microprocessor 101 decrypts the data as illustrated by the receiving station 12 in FIG. 1.

Figure 3A:
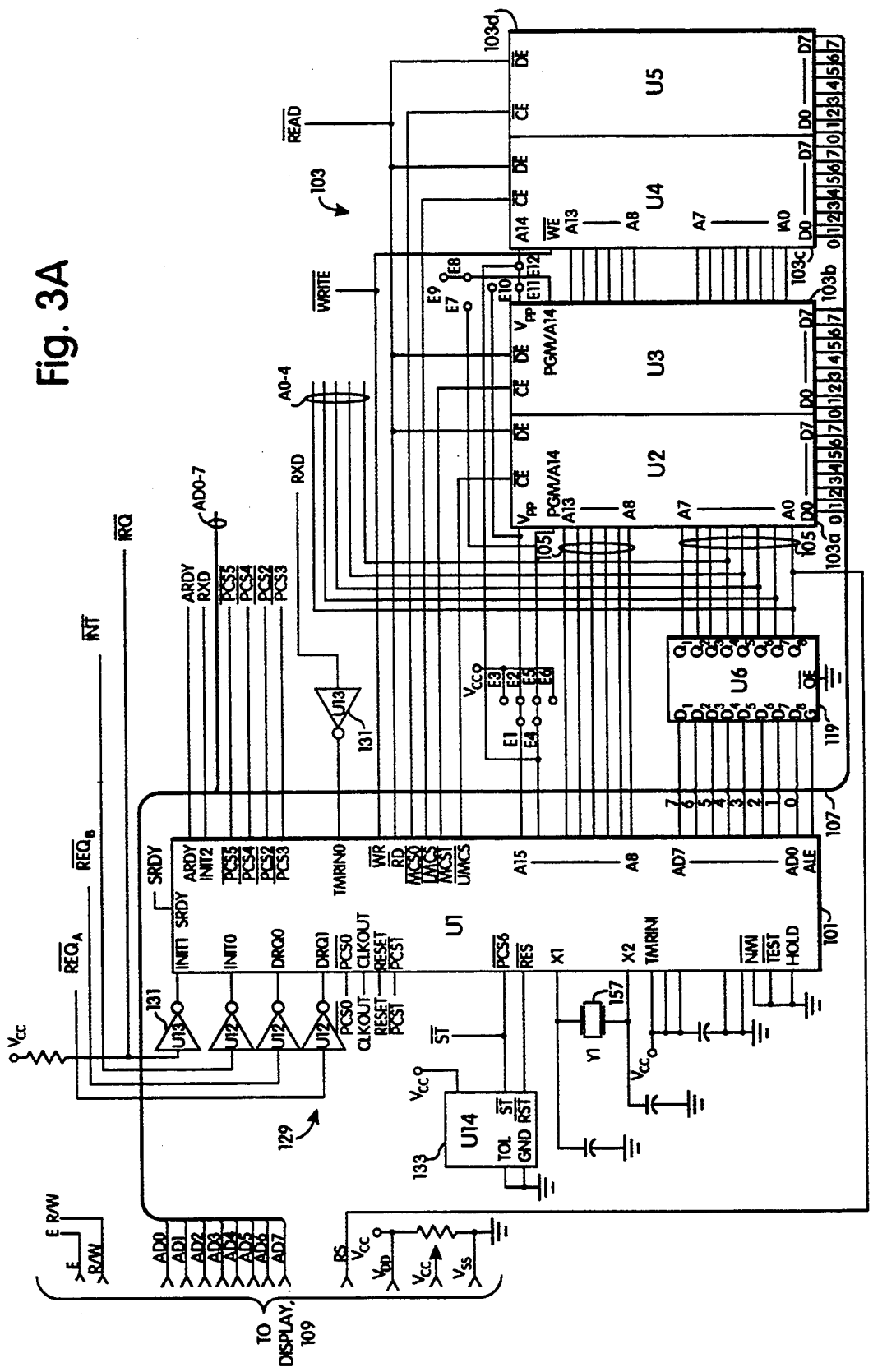
FIGS. 3A, 3B and 3C are schematic representations which, in combination, illustrate a preferred embodiment of the modem apparatus of FIG. 2.
Figure 3B:
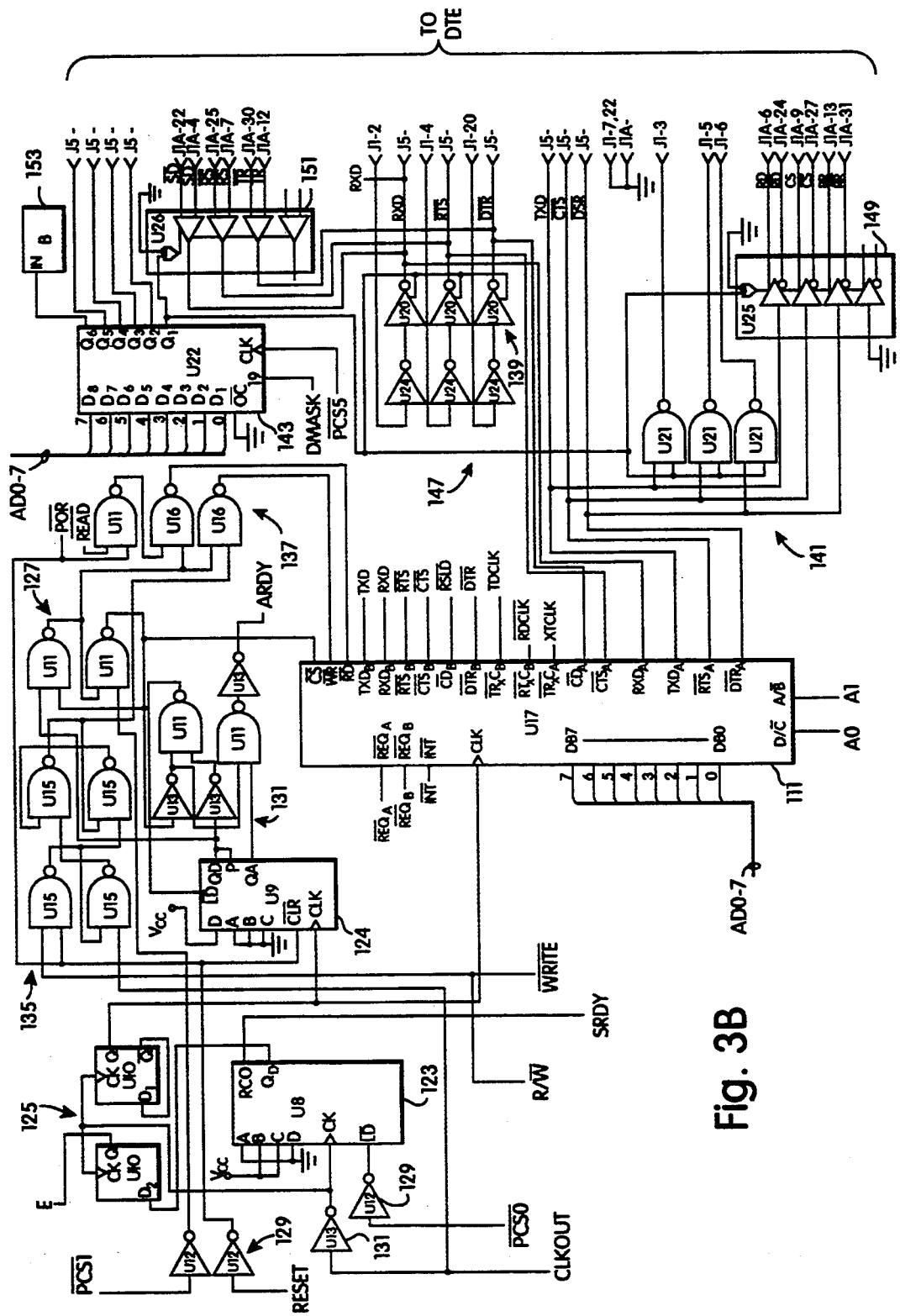
Figure 3C:
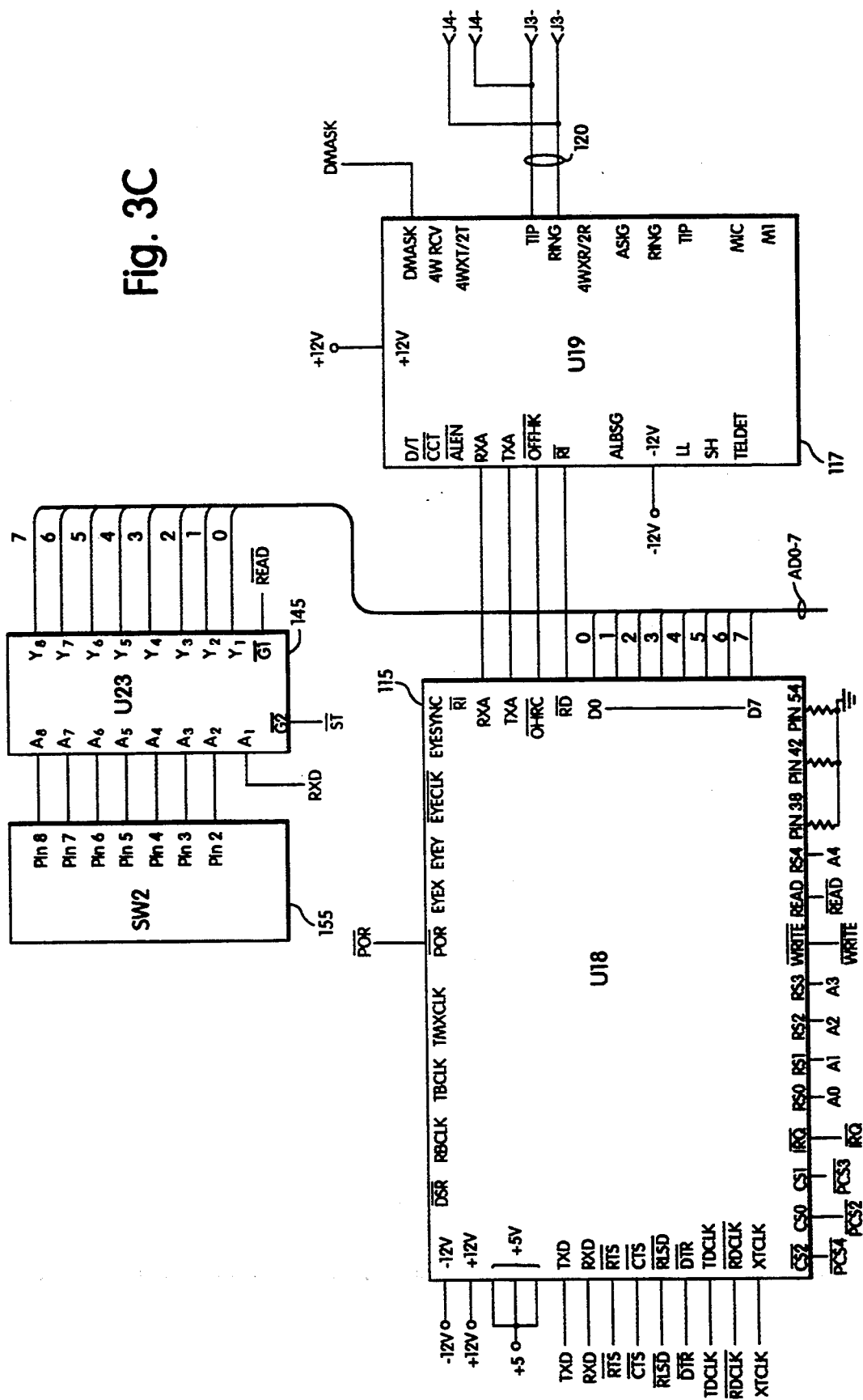

FIGS. 3A, 3B and 3C—Preferred Embodiment

FIGS. 3A, 3B and 3C, in combination, illustrate a preferred embodiment of the modem hardware shown in FIG. 2. It should be noted that the devices illustrated in FIGS. 3A, 3B and 3C which are common to the functional units in FIG. 2 are designated by identical "Drawing Reference Characters".

FIG. 3A illustrates the microprocessor 101, the memory subsystem 103, and various supporting logic. The crystal inputs X1 and X2 to the microprocessor 101 provides an external connection for a fundamental mode parallel resonant crystal 157 (Y1). The resonant crystal 157 is utilized by the internal oscillator of the microprocessor 101 to generate the clock signal, CLKOUT. In a preferred embodiment, the resonant crystal 157 has a fundamental frequency of 14.7456 Mhz.

The memory subsystem 103 includes memory devices 103a–d. The "jumper points" are designated as "E1—E12". The "jumper points" facilitate implementing various types of memory devices and memory configurations employed by the memory subsystem 103. The memory subsystem 103 is discussed in detail below.

FIG. 3B illustrates the serial communications controller (SCC) 111, the serial port 121, the data terminal equipment (DTE), and various supporting logic. The integrated circuits 123, 124, 125, 127, 129, 131, 135 and 137 are utilized to time delay various signals from the microprocessor 101 and thereby provide orderly operation between the microprocessor 101, the SCC 111 and the modem unit 115. These integrated circuits also generate the synchronous ready signal and asynchronous ready signal, SRDY and ARDY, respectively.

As mentioned above, the data terminal equipment (DTE) communicates with the modem hardware over the serial port 121 (e.g., a RS-232c or a RS-422 standard port). FIG. 3B illustrates interface configurations to implement both a RS-232 interface standard and a RS-422 interface standard. The differential line drivers 149 (U25) and the differential line receivers 151 (U26) are employed to implement the RS-422 interface standard. The line drivers 139 (U20), 141 (U21), and 147 (U24) are employed to implement the RS-232 interface standard. It will be readily appreciated by those skilled in the art that although two types of interfaces are depicted, only one interface is actually utilized at one time. The integrated circuits employed to implement the interface standard not used are unnecessary.

FIG. 3C illustrates the modem unit 115, the direct access adapter (DAA) 117, the telephone interface 120, and various supporting logic. The micro-switch bank 155 (SW2) provide the user the option of "hard-wiring" the baud rate settings for the modem unit 115. In operation, the switch settings of the micro-switch bank 155 are passed to the modem unit 115, via the octal buffer 145 (U23), when the modem hardware is powered-up or reset.

TABLE 1, below, provides information on the model or type of devices employed in the modem hardware illustrated in FIGS. 3A, 3B, and 3C. TABLE 1 also provides one of several manufactures and/or suppliers of the devices. TABLE 1 references the devices by "Drawing Reference Characters" and "Device Reference Designations" consistent with their usage in FIGS. 3A, 3B, and 3C.

TABLE 1

| Drawing Ref. Char. | Device Ref. Desig. | Type | Manufacturer |
|---|---|---|---|
| 101 | U1 | 80188 | Motorola, Inc. |
| 103a | U2 | 27C256 | Intel Corporation |
| 103b | U3 | 27C256 | Intel Corporation |
| 103c | U4 | JEDEC | Intel Corporation |
| 103d | U5 | JEDEC | Intel Corporation |
| 119 | U6 | 74ALS373 | Texas Instruments, Inc. |
| 123 | U8 | 74HC163 | Texas Instruments, Inc. |
| 124 | U9 | 74HC163 | Texas Instruments, Inc. |
| 125 | U10 | 74HC163 | Texas Instruments, Inc. |
| 127 | U11 | 24AS00 | Texas Instruments, Inc. |
| 129 | U12 | 74AS04 | Texas Instruments, Inc. |
| 131 | U13 | 74AS04 | Texas Instruments, Inc. |
| 133 | U14 | DS1232 | Dallas Semiconductor |
| 135 | U15 | 74AS00 | Texas Instruments, Inc. |
| 137 | U16 | 74AS00 | Texas Instruments, Inc. |
| 111 | U17 | 82530 | Intel Corporation |
| 115 | U18 | R9696-DP | Rockwell International Corp. |
| 117 | U19 | CH1828 | Cermetek Microelectronics, Inc. |
| 139 | U20 | 74HC126 | Motorola, Inc. |
| 141 | U21 | DS14C88 | Motorola, Inc. |
| 143 | U22 | 74HC374 | Texas Instruments, Inc. |
| 145 | U23 | 74HC540 | Texas Instruments, Inc. |
| 147 | U24 | | Motorola, Inc. |
| 149 | U25 | 26LS31 | Motorola, Inc. |
| 151 | U26 | 26LS32 | Motorola, Inc. |
| 153 | B | CMB06 | Star Micronics |
| 155 | SW2 | | |
| 157 | Y1 | | |

The manufacturer specification sheets, commonly known as "Data Sheets", for the device model or type indicated above are hereby incorporated by reference.

As mentioned above, the memory subsystem 103 includes memory devices 103a–d. The memory subsystem 103 may be implemented using RAM, ROM and/or PROM type memory devices. TABLE 1 indicates the memory devices 103a and 103b are type 27C256, ultra violet erasable programmable read only memories (UV PROMs) manufactured by Intel Corporation. When either of memory devices 103a or 103b is a PROM type device, then both 103a and 103b should be implemented using PROM type devices.

Memory devices 103a and 103b may also be type HM62256LP-SL series or HM62256LFP-SL series CMOS static RAM manufactured by Hitachi America, Ltd. Further, memory devices 103c and 103d may also be type HM62256LP-SL series or HM62256LFP-SL series CMOS static RAM. It will be appreciated by one skilled in the art that a JEDEC type RAM, memory devices 103c and 103d, is a RAM that conforms to the industry standards regarding the integrated circuit packaging. The type HM62256LP-SL series or HM62256LFP-SL series CMOS static RAM devices meet JEDEC standards.

The storage capacity of the memory subsystem 103 may be increased or decreased in relation to modem hardware and/or modem software requirements. For example, memory subsystem 103 may be configured using 128K type, 256K type, and/or 512K type RAMs/ROMs/PROMs. The "jumper points" facilitate implementing various memory device types and memory configurations of the memory subsystem 103. The manufacturer, by way of a memory device's data sheet, provides configuration instructions. These instructions dictate "jumper point" usage.

The power and ground pins for the integrated circuits, the buzzer 153, and the micro-switch bank 155 of the modem hardware are not depicted in FIGS. 3A, 3B and 3C. TABLE 2, below, provides power and ground pin connections for the devices used to implement the modem hardware illustrated in FIGS. 3A, 3B and 3C. In particular, TABLE 2 indicates the pin connections to +5V, digital ground, analog ground, and +/−12V. TABLE 2 references the devices by the "Drawing Reference Characters" and "Device Reference Designations" consistent with their usage in FIGS. 3A, 3B, and 3C.

Figure 4:
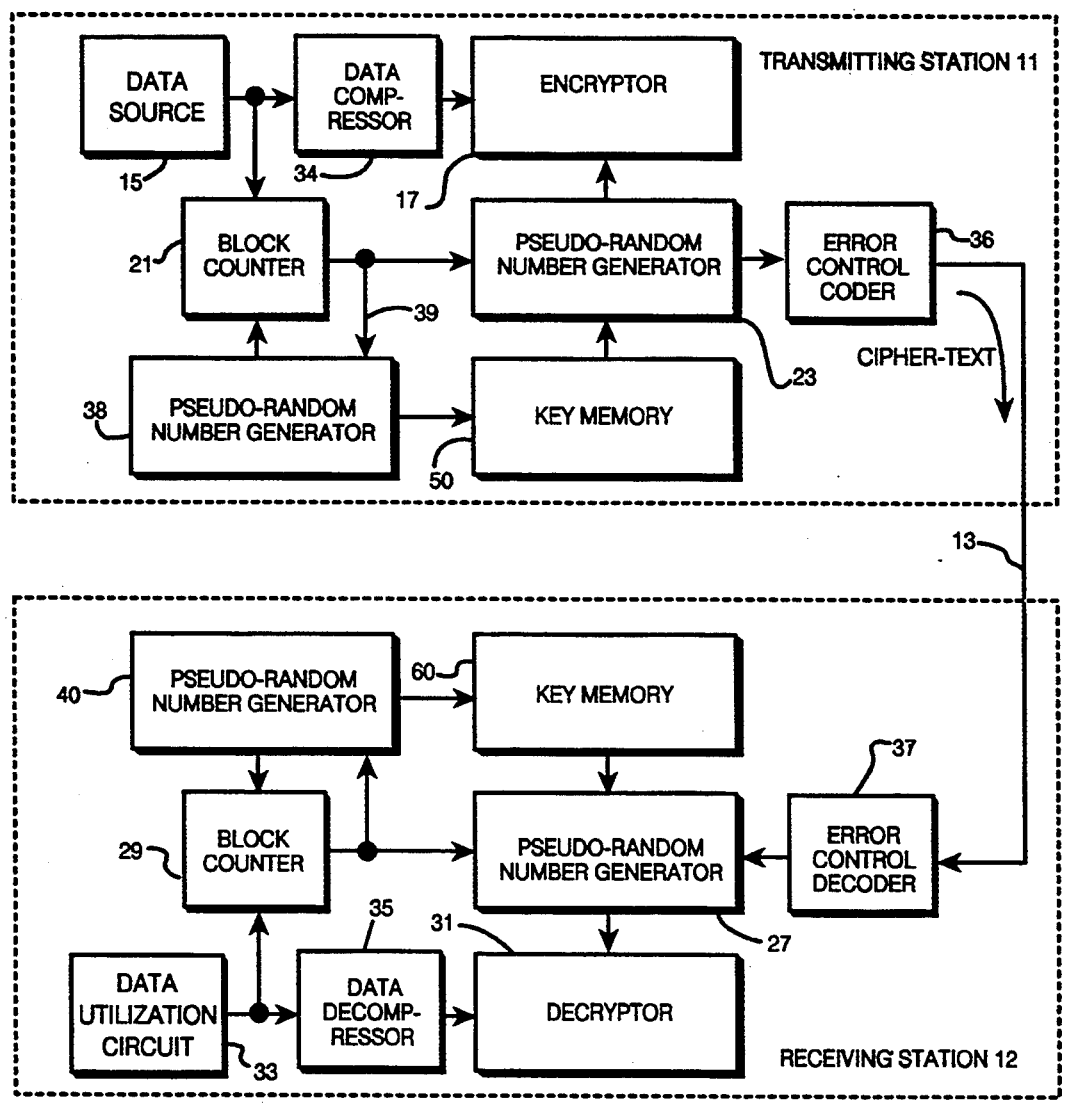
FIG. 4 is a functional block diagram illustrating enhanced signal processing capabilities used in the preferred embodiment of the invention.

FIG. 4—Enhancements

The principles of the invention may be advantageously employed to encipher and decipher data which is also compressed for enhanced transmission efficiency and combined with error detection/correction coding. Moreover, the invention may utilize a key storage system to store unique keys for different called and calling parties, and may employ means for varying the interval number in a random fashion so that the time durations during which particular encryption keys are active varies in unpredictable ways. These further enhancements to the system are depicted in FIG. 4 of the drawings which illustrates the preferred embodiment of the invention.

If the data signals are to be "compressed" for increased transmission efficiency (e.g., by Huffman encoding or the like), the compression processing of the data should precede encryption, because the encryption process inherently randomizes the data, eliminating the redundancy upon which efficient compression depends. On the other hand, error control processing (such as adding cyclic redundancy check (CRC) block checking codes) is best done after encryption in accordance with the invention, because successful synchronization of the advance signals from the block counters 21 and 29 requires substantially error-free data transmission (which the error-checking protocols insure).

As contemplated by the present invention, data compression, data encryption, and error control functions may all be performed by a single control processor. Thus, when a modem of the class shown in FIG. 2 of the drawings is employed, the microprocessor 101 operates on the outgoing data stream by first performing data compression, then performing the encryption step,

TABLE 2

| Drawing Reference Character | Device Reference Designation | +5 V Pin(s) | Digital Ground Pin(s) | Analog Ground Pin(s) | +12 V | −12 V |
| --- | --- | --- | --- | --- | --- | --- |
| 101 | U1 | 9, 21, 43 | 26, 46, 47, 50, 60 | | | |
| 103a | U2 | 28 | 14 | | | |
| 103b | U3 | 28 | 14 | | | |
| 103c | U4 | 28 | 14 | | | |
| 103d | U5 | 28 | 14 | | | |
| 119 | U6 | 20 | 1, 10 | | | |
| 123 | U8 | 1, 4, 5, 7, 10, 16 | 3, 6, 8 | | | |
| 124 | U9 | 6, 10, 16 | 3, 4, 5, 8 | | | |
| 125 | U10 | 1, 4, 10, 13, 14 | 7 | | | |
| 127 | U11 | 14 | 7 | | | |
| 129 | U12 | 14 | 7 | | | |
| 131 | U13 | 14 | 7 | | | |
| 133 | U14 | 8 | 3, 4 | | | |
| 135 | U15 | 14 | 7 | | | |
| 137 | U16 | 14 | 7 | | | |
| 111 | U17 | 7, 8, 9 | 31 | | | |
| 115 | U18 | 1, 45, 61 | 29, 37, 53 | 30, 31 | 32 | 36 |
| 117 | U19 | | | 3, 4 | 1 | 10 |
| 139 | U20 | 14 | 7, 12, 13 | | | |
| 141 | U21 | | | 7 | 14 | 1 |
| 143 | U22 | 20 | 1, 10 | | | |
| 145 | U23 | 20 | 10 | | | |
| 147 | U24 | 14 | 7 | | | |
| 149 | U25 | 16 | 8, 12, 15 | | | |
| 151 | U26 | 16 | 8, 12 | | | |
| 153 | B | Power | Ground | | | |
| 155 | SW2 | 16 | 9 | | | |

The bypass capacitors are not illustrated in FIGS. 3A, 3B and 3C. It will be appreciated by those skilled in the art that these capacitors have a first terminal connected to the power pin of the integrated circuit and a second terminal to ground. These type capacitors may have a capacitance value of about 0.01 microfarad.

and finally performing the error detection/protection processing before forwarding the data on to the modem module 113 for trellis coding and digital-to-analog conversion for transmission over the telephone network.

The signal processing functions used in this enhanced arrangement are shown in FIG. 4 of the drawings. In FIG. 4, the functional units employed in the basic system shown in FIG. 1 are designated by the same numerals used in FIG. 1, and the description of those units need not be repeated.

A data compressor 34 is shown connected between the data source 15 and the encryptor 17. In the hardware as seen in FIG. 2, data compression may be conveniently performed by the microprocessor 101 on the data from the DTE obtained via the SCC 111. At the receiving station 12 as seen in FIG. 4, a data decompressor 35 is connected between the decryptor 31 and the data utilization device 33. Note also that, as depicted in FIG. 4, the data is monitored by the block counter 21 prior to compression, rather than afterwards. Correspondingly, at the receiving station 12, the block counter 29 monitors the data flow after it is decompressed. In this way, both counters monitor the same data stream. Both could be reconnected to monitor the compressed data stream if desired, however.

Error control processing is done by the error control coder 36 which, for example, might add cyclic redundancy check data to the data being transmitted to permit data correction in the error detector/corrector 37 at the receiving end, or to initiate a retransmission under the active error correction protocol. This error correction processing (at both ends) may be advantageously performed by the same microprocessor that performs the data compression and encryption functions.

To further enhance the security of the transmission, the duration of the interval during which each given key is active may be changed in a pseudo-random fashion. For this purpose, a pseudo-random number generator 38 is used at the transmitting station 11 to supply the interval numbers to the block counter 21. The generator 38 is advanced to a new number each time an advance signal is received from the output of block counter 21 over line 39 (so that a new interval number is supplied to the block counter 21 each time it advances the encryption key generator 23). Block counter 21 may simply load the interval number from generator 38 into an accumulator which is then decremented toward zero when it emits the advance signal to generator 23, at which time it is loaded with a new and different interval number from generator 38. At the receiving station 12, a pseudo-random generator 40 (which performs the same pseudo-random number generating process as the generator 38 at the transmitting station 11) supplies a sequence of interval numbers to counter 29. Generator 40 is advanced by the advance signals from counter 29 which also advance the encryption key generator 27.

The random number generators 23 and 38 at the transmitting station obtain their seed values from a key memory 50. Key memory 50 stores the random number keys indexed by destination (along with telephone dial-up numbers for automatic dialing). Similarly, at the receiving station, the seed values for the remote terminals from which the receiving station is authorized to receive information are stored in a key memory 60 connected to supply seed values to the generators 27 and 40. The key memories eliminates the need for authorized users to remember and enter keys before each transmission or reception.

In addition, the use of key memories allows the stations to be operated as terminals in a secure network under the control of a central station which, in separate transmissions over different secure links, enters (and erases) the keys needed by authorized sending and receiving stations connected to the network. In this way, the central station permits one network user to transmit to a single other user, or to "broadcast" to selected, authorized users on the network only, while enabling all terminals to use the network for unsecured transmissions.

The key memory within each station modem unit includes a lookup table comprising a plurality of entries, each of which stores control information concerning another station in the network. Advantageously, each table entry specifies:

(1) the serial number which identifies a remote hardware unit (and which corresponds to a serial number stored in the non-volatile memory of that remote unit);
(2) the current encryption key value (e.g. an 8 digit DES encryption key) to be used for communications to and from that remote station; and
(3) an optional dial-up telephone number (or comparable routing information used by the network switching system).

A switch operated by a physical key is also advantageously included in each station unit and has "security enabled" and "security disabled" positions. The key memory can only be loaded with values identifying one or more remote units with whom communications are authorized when the switch is in the "security disabled" position (typically when the unit is being set up by an authorized operator who has the physical key needed to disable the security switch). At that time, the table can be loaded either from a remote (host) station or by a local command which takes the form of an extension to the standard modem AT command set. That load command take the form:

AT JSN KDESKEY PHONENUM where AT is the AT command prefix, JSN is the letter "J" immediately followed by the serial number of the remote station with which communications is authorized, KDESKEY is the letter "K" immediately followed by an 8 character DES encryption key, and PHONENUM is the standard routing code (e.g. dial-up phone number string). In the preferred embodiment, up to 1000 serial numbers and keys, and up to 100 optional dial-up phone number strings (each with up to 39 digits) may stored in the key memory lookup table.

To make a secured transmission, the calling station uses PHONENUM to establish the connection, normal modem handshaking procedures are executed to establish a working data connection, including standard parameter negotiations (e.g. the V.42 parameters if that protocol is being used). If the security key is enabled, and a secure transmission is being requested by the caller, the answering modem will not send its parameter message (the V.42 XID frame) until it receives one from the originator, this initial message including the (unencrypted) originator's serial number. The answering modem uses the received serial number to select the locally stored encryption key corresponding to that serial number, and encrypts its responsive XID frame using the fetched key. Thereafter, all transmissions between the originating and answering modems are encrypted and the encryption keys at each end of the secure ling are thereafter altered in accordance with the encryption algorithm as heretofore described.

In accordance with an important feature of this arrangement, the host system may initially authorize communication between two connected units by supplying the appropriate serial numbers and initial key values (unique to an authorized link), but as soon as transmission begins between the two units over the authorized link, the encryption keys are changed in ways that are unknowable to the host. As a consequence, knowledge of the initial seed values supplied by the host are of no further value and cannot be used to monitor ongoing communications over the authorized link.

Programming

The encryption and decryption operations may be performed by special purpose devices, such as those widely sold to implement the DES standard encryption method. As noted, however, the encryption function can be less expensively added by suitable programming of the microprocessor 101 to perform this function as well as the control, compression, and error handling functions.

Working computer programs for use with an 80188 microprocessor appear in the computer program listing in the microfiche appendix. These computer programs perform the encryption, decryption, control, compression, and error handling functions. The computer program listing appearing in the microfiche appendix includes 14 modules, arranged alphabetically therein, named: (1) "COMM.C"; (2) "COMMAND.C"; (3) "DISPLAY.ASM"; (4) "DISPLAY.H"; (5) "ENCRYPT.ASM"; (6) "EQUS. INC"; (7) "KEY_SCHD. ASM"; (8) "MAIN. C"; (9) "MODEM. ASM"; (10) "MODEM.H"; (11) "SCC.ASM"; (12) "START-.ASM"; (13)"TEST.C"; and (14) "UTIL. C".

In the microfiche appendix, each computer program module includes a comment section followed by a computer program listing. Comments are also interspersed within the program listing. Each program is briefly described below.

The "COMM.C" is a "C" computer language program that performs communication routines. The "COMMAND.C" is also a "C" computer language program that performs command processing routines. The "DISPLAY.ASM" is an assembly language program that performs display initialization and display interface. The "DISPLAY.H" is a "C" computer language program whose function is to output LCD display strings. The "ENCRYPT.ASM" is an assembly language program having the function "KEY_SCHD ASM" which calculates a sequence of 16 key-related values required in the DES algorithm. This sequence is pre-calculated when the DES key is changed to increase the speed of encryption and/or decryption.

The "EQUS.INC" is an assembly language listing that defines assembly language names used in the system. The "MAIN.C" is a "C" computer language program that performs modem supervisory control. The "MODEM.ASM" is an assembly language program that facilitates interfacing with the modem unit 115. The "MODEM.H" is a "C" computer language program that provides definitions and parameters for the firmware of the modem unit 115. The "SCC.ASM" is an assembly language program that facilitates interfacing with the SCC 111. The "STARTUP.ASM" is an assembly language program that performs initial setup and POST routines. The "TEST.C" is a "C" computer language routine that performs self-test and power-on self-check. The "UTIL.C" is a "C" computer language routine that performs utility routines for the modem unit 115.

The computer program modules written in the "C" computer language are specifically designed for "MICROSOFT C 5.1". It should be noted that computer languages other than "C" may be employed to perform the function for which the "C" computer language modules were so designed.

Various preferred embodiments of the present invention have been described. It is understood, however, that changes and modifications can be made without departing from the true scope and spirit of the present invention as defined by the following claims, which are to be interpreted in view of the foregoing.

What is claimed is:

1. A method for transmitting data comprising a sequence of blocks in encrypted form over a communication link from a transmitter to a receiver comprising, in combination, the steps of:

providing a seed value to both said transmitter and receiver, generating a first sequence of pseudo-random key values based on said seed value at said transmitter, each new key value in said sequence being produced at a time dependent upon a predetermined characteristic of the data being transmitted over said link, encrypting the data sent over said link at said transmitter in accordance with said first sequence, generating a second sequence of pseudo-random key values based on said seed value at said receiver, each new key value in said sequence being produced at a time dependent upon said predetermined characteristic of said data transmitted over said link such that said first and second sequences are identical to one another a new one of said key values in said first and said second sequences being produced each time a predetermined number of said blocks are transmitted over said link, and decrypting the data sent over said link at said receiver in accordance with said second sequence.

2. The method as set forth in claim 1 further including the step of altering said predetermined number of blocks each time said new key value in said first and said second sequences is produced.

* * * * *

UNITED STATES PATENT AND TRADEMARK OFFICE
CERTIFICATE OF CORRECTION

| | | |
|---|---|---|
| PATENT NO. | : 5,412,730 C1 | Page 1 of 1 |
| APPLICATION NO. | : 90/011405 | |
| DATED | : September 20, 2011 | |
| INVENTOR(S) | : Michael F. Jones | |

It is certified that error appears in the above-identified patent and that said Letters Patent is hereby corrected as shown below:

On the Title page item (73), change "Top" to --TOP--; and

On the Title page item (56) under U.S. Patent Documents, line 6, change "Herbern" to --Hebern--.

On the Title page item (56), second col. line 1, under Other Publications change "Encrption" to --Encryption--.

Page 2, first column, line 3, change "Herbern" to --Hebern--; and line 35, change "Frosch et al." to --Doland--.

Page 2, second column, line 15, change "Institute" to --Institution--;

line 31, change "Enterntainment" to --Entertainment--;

line 46, change "Des" to --DES--; and line 55, change "Communication" to --Communications--.

Page 3, first column, line 3, change "unkown" to --unknown--; and line 11, change "Cryptogprahy" to --Cryptography--.

Page 3, second column, lines 5-6, change
"http://groups.google.com/sci.crypt/browse_frm/month/1987-09" to
--http://groups.google.com/group/sci.crypt/browse_frm/month/1987-09--; and line 28, change "Philadephia" to --Philadelphia--.

Signed and Sealed this
Third Day of April, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 5,412,730 C1 | Page 1 of 2 |
| APPLICATION NO. | : 90/011405 | |
| DATED | : September 20, 2011 | |
| INVENTOR(S) | : Michael F. Jones | |

It is certified that error appears in the above-identified patent and that said Letters Patent is hereby corrected as shown below:

On the Title page item (73), change "Top" to --TQP--; and

On the Title page item (56), under U.S. Patent Documents, line 6, change "Herbern" to --Hebern--.

On the Title page item (56), second col. line 1, under Other Publications, change "Encrption" to --Encryption--.

Page 2, first column, line 3, change "Herbern" to --Hebern--; and line 35, change "Frosch et al." to --Doland--.

Page 2, second column, line 15, change "Institute" to --Institution--;

line 31, change "Enterntainment" to --Entertainment--;

line 46, change "Des" to --DES--; and line 55, change "Communication" to --Communications--.

Page 3, first column, line 3, change "unkown" to --unknown--; and line 11, change "Cryptogprahy" to --Cryptography--.

This certificate supersedes the Certificate of Correction issued April 3, 2012.

Signed and Sealed this
Fourth Day of September, 2012

David J. Kappos
*Director of the United States Patent and Trademark Office*

CERTIFICATE OF CORRECTION (continued)
U.S. Pat. No. 5,412,730 C1

Page 3, second column, lines 5-6, change
"http://groups.google.com/sci.crypt/browse_frm/month/1987-09" to
--http://groups.google.com/group/sci.crypt/browse_frm/month/1987-09--; and line 28, change "Philadephia" to --Philadelphia--.

(12) EX PARTE REEXAMINATION CERTIFICATE (8548th)
United States Patent
Jones

(10) Number: US 5,412,730 C1
(45) Certificate Issued: Sep. 20, 2011

(54) ENCRYPTED DATA TRANSMISSION SYSTEM EMPLOYING MEANS FOR RANDOMLY ALTERING ENCRYPTION KEYS

(75) Inventor: Michael F. Jones, Nashua, NH (US)

(73) Assignee: Top Development, LLC, Marshall, TX (US)

Reexamination Request:
No. 90/011,405, Dec. 27, 2010

Reexamination Certificate for:
Patent No.: 5,412,730
Issued: May 2, 1995
Appl. No.: 07/872,674
Filed: Apr. 23, 1992

Related U.S. Application Data

(63) Continuation-in-part of application No. 07/418,178, filed on Oct. 6, 1989, now abandoned.

(51) Int. Cl.
*H04L 9/00* (2006.01)

(52) U.S. Cl. .......................... 380/46; 380/262; 380/266; 380/29

(58) Field of Classification Search .................. None
See application file for complete search history.

(56) References Cited

U.S. PATENT DOCUMENTS

| | | | |
|---|---|---|---|
| 1,295,572 A | 2/1919 | Newcomb |
| 1,310,719 A | 7/1919 | Vernam |
| 1,320,908 A | 11/1919 | Parker |
| 1,356,546 A | 10/1920 | Morehouse |
| 1,479,846 A | 1/1924 | Vernam |
| 1,510,441 A | 9/1924 | Herbern |
| 1,522,775 A | 1/1925 | Friedman |
| 1,533,252 A | 4/1925 | Koch |
| 1,598,673 A | 9/1926 | Blackwell et al. |

(Continued)

FOREIGN PATENT DOCUMENTS

| | | |
|---|---|---|
| CA | 1 189 925 | 7/1985 |
| CA | 1 209 664 | 8/1986 |
| EP | 0 002 580 | 6/1979 |
| EP | 0 028 273 | 5/1981 |
| EP | 0 063 332 | 10/1982 |
| EP | 0 093 525 | 11/1983 |
| EP | 0 148 960 | 7/1985 |
| EP | 0 197 392 | 10/1986 |
| GB | 1 295 572 | 11/1972 |
| GB | 2 008 363 | 5/1979 |
| GB | 2 067 871 | 7/1981 |
| GB | 2 076 615 | 12/1981 |
| GB | 2 151 886 | 7/1985 |
| GB | 2 188 514 | 9/1987 |
| JP | 60-003242 | 1/1985 |
| WO | WO 87/00377 | 1/1987 |
| WO | WO 87/03442 | 6/1987 |
| WO | WO 88/10541 | 12/1988 |

OTHER PUBLICATIONS

*NBIS Data Encrption Standard, National Institute of Standards and Technology*, Dec. 30, 1993, available at http://graphcomp/info/crypt/des.txt on Jun. 2, 2011, pp. 1–5.

(Continued)

*Primary Examiner*—Minh Dieu Nguyen

(57) ABSTRACT

A modem suitable for transmitting encrypted data over voice-grade telephone line. The modem is implemented by the combination of integrated circuit components including a microprocessor, a serial communications controller which communicates with connected data terminal equipment, and a modulator/demodulator for translating between voice band tone signals and digital data. Psuedo random number generators are employed at both the transmitting and receiving stations to supply identical sequences of encryption keys to a transmitting encoder and a receiving decoder. An initial random number seed value is made available to both stations. The random number generators are advanced at times determined by predetermined characteristics of the data being transmitted so that, after transmission has taken place, the common encryption key can be known only to the transmitting and receiving stations.

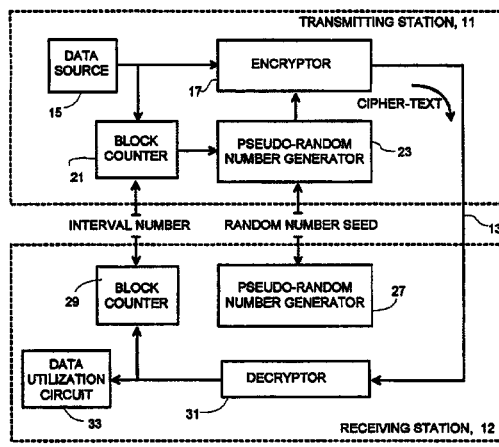

U.S. PATENT DOCUMENTS

| | | |
|---|---|---|
| 1,657,411 A | 1/1928 | Scherbius |
| 1,683,072 A | 9/1928 | Herbern |
| 1,848,291 A | 3/1932 | Hitt |
| 1,861,857 A | 6/1932 | Hebern |
| 2,373,890 A | 4/1945 | Hebern |
| 2,401,855 A | 6/1946 | Briggs et al. |
| 2,403,280 A | 7/1946 | Hicks |
| 3,546,380 A | 12/1970 | Sturzlager |
| 3,659,046 A | 4/1972 | Angeleri et al. |
| 3,702,900 A | 11/1972 | Sturzinger |
| 3,752,920 A | 8/1973 | Gemperle |
| 3,781,472 A | 12/1973 | Goode et al. |
| 3,798,359 A | 3/1974 | Feistel |
| 3,798,360 A | 3/1974 | Feistel |
| 3,852,534 A | 12/1974 | Tilk |
| 3,958,081 A | 5/1976 | Ehrsam et al. |
| 4,071,693 A | 1/1978 | Frutiger |
| 4,074,066 A | 2/1978 | Ehrsam et al. |
| 4,078,152 A | 3/1978 | Tuckerman, III |
| 4,107,458 A | 8/1978 | Constant |
| 4,133,973 A | 1/1979 | Branscome et al. |
| 4,133,974 A | 1/1979 | Morgan |
| 4,157,453 A | 6/1979 | Rosen |
| 4,157,454 A | 6/1979 | Becker |
| 4,170,714 A | 10/1979 | Branscome et al. |
| 4,176,246 A | 11/1979 | Gaetzi |
| 4,179,663 A | 12/1979 | Vasseur |
| 4,195,196 A | 3/1980 | Feistel |
| 4,200,770 A | 4/1980 | Hellman et al. |
| 4,202,051 A | 5/1980 | Davida et al. |
| 4,203,166 A | 5/1980 | Ehrsam et al. |
| 4,229,818 A | 10/1980 | Matyas et al. |
| 4,249,180 A | 2/1981 | Eberle et al. |
| 4,304,962 A | 12/1981 | Fracassi et al. |
| 4,310,720 A | 1/1982 | Check, Jr. |
| 4,316,055 A | 2/1982 | Feistel |
| 4,319,079 A | 3/1982 | Best |
| RE30,957 E | 6/1982 | Feistel |
| 4,341,925 A | 7/1982 | Frosch et al. |
| 4,369,332 A | 1/1983 | Campbell, Jr. |
| 4,369,333 A | 1/1983 | Gemperle et al. |
| 4,369,434 A | 1/1983 | Mueller |
| 4,429,180 A | 1/1984 | Unkenholz |
| 4,433,211 A | 2/1984 | McCalmont et al. |
| 4,442,527 A | 4/1984 | Munday |
| 4,447,672 A | 5/1984 | Nakamura |
| 4,484,027 A | 11/1984 | Lee et al. |
| 4,578,530 A | 3/1986 | Zeidler |
| 4,628,359 A | 12/1986 | Okada et al. |
| 4,634,808 A | 1/1987 | Moerder |
| 4,649,233 A | 3/1987 | Bass et al. |
| 4,652,990 A | 3/1987 | Pailen et al. |
| 4,654,480 A | 3/1987 | Weiss |
| 4,694,491 A | 9/1987 | Horne et al. |
| 4,723,246 A | 2/1988 | Weldon, Jr. |
| 4,747,139 A | 5/1988 | Taaffe |
| 4,754,482 A | 6/1988 | Weiss |
| 4,771,458 A | 9/1988 | Citta et al. |
| 4,791,669 A | 12/1988 | Kage |
| 4,797,921 A | 1/1989 | Shiraishi |
| 4,797,922 A | 1/1989 | Massey et al. |
| 4,802,217 A | 1/1989 | Michener |
| 4,811,394 A | 3/1989 | Ragavan et al. |
| 4,827,507 A | 5/1989 | Marry et al. |
| 4,856,063 A | 8/1989 | McCalmont |
| 4,860,353 A | 8/1989 | Brown |
| 4,864,615 A | 9/1989 | Bennett et al. |
| 4,888,800 A | 12/1989 | Marshall et al. |
| 4,890,324 A | 12/1989 | Jansen |
| RE33,189 E | 3/1990 | Lee et al. |
| 4,924,516 A | 5/1990 | Bremer et al. |
| 4,930,139 A | 5/1990 | Chandler et al. |
| 4,933,971 A | 6/1990 | Bestock et al. |
| 4,935,961 A | 6/1990 | Gargiulo et al. |
| 4,980,913 A | 12/1990 | Skret |
| 5,003,596 A | 3/1991 | Wood |
| 5,058,158 A | 10/1991 | Matias et al. |
| 5,067,156 A | 11/1991 | Martin |
| 5,253,294 A | 10/1993 | Maurer |
| 6,097,812 A | 8/2000 | Friedman |
| 6,912,284 B1 | 6/2005 | Palmatier |

OTHER PUBLICATIONS

American National Standard Institute (ANSI), *Accredited Standards Committee X9, Financial Services, American National Standard Institute (ANSI), Financial Institute Key Management (Wholesale)*, Apr. 4, 1985.

Ayoub, *Encryption with Keyed Random Permutations, Electronics Letters*, v.17 issue 17, Aug. 20, 1981; pp. 583–585.

Bounas, *Direct Determination of a Seed Binary Matrix, Information Processing Letters*, v.20, issue 1, Jan. 2, 1985; pp. 47–50.

Bright et al., *Cryptography Using Modular Software Elements, AFIPS Conference Proceedings*, v.45, 1976; pp. 113–123.

Brown, *Europe Holds Challenges for Voice, Data Protection, Government Computer News*, v.7, No. 21, 1998.

Claassen et al., *Secure Communication Procedure for ISDN, Comsig '88*, 1988.

Defendant's Ticketmaster Entertainment, Inc. et al., *Invalidity Contentions of TQP Development, LLC v. Ticketmaster Enterntainment, Inc. et al.*, Civil Action 2:09–cv–279 TJW, currently pending in the U.S. District Court for the Eastern District of Texas, Marshall Division, dated Oct. 27, 2010; pp. 1–521 (including Exhibits A–C).

Diffie et al., *Privacy and Authentication: An Introduction to Cryptography, Proceedings of the IEEE*, v.67, No. 3, Mar. 1979, pp. 397–427.

Edwards, *Concerns Over Data Security Stimulate Countermeasures, Communications News*, v.21, 1984.

Ehrsam et al., *A Cryptographic Key Management Scheme For Implementing The Data Encryption Standard, IBM Systems Journal 17*, No. 2, 1978, pp. 106–125.

Federal Information Processing Standards, *Data Encryption Standard, Federal Information Processing Standards*, Jan. 15, 1977.

Federal Information Processing Standards, *Des Modes of Operation, Federal Information Processing Standards*, Publication 81, Dec. 2, 1980.

Feistel, *Cryptography and Computer Privacy, Scientific American*, v.228, No. 5, May 1973, pp. 15–23.

Feistel et al., *Some Cryptographic Techniques for Machine–to–Machine Data Communications, Proceedings of the IEEE*, v.63, issue 11, Nov. 1975; pp. 1545–1554.

Goyal et al., *Encryption Using Random Keys: A Scheme for Secure Communication, IEEE*, 1988.

Gersho, *Perfect Secrecy Encryption of Analog Signals, IEEE Journal on Selected Areas in Communications*, v.Sac–2, No. 3, May 1984.

Ingermarsson et al., *A Conference Key Distribution System, IEEE Transactions on Information Theory*, v.28, No. 5, Sep. 1982.

Jansen et al., *Modes of Blockcipher Algorithms and Their Protection Against Active Eavesdropping, Advances in Cryptology—Eurocrypt '87*, 1987.

Kahn, *The Codebreakers: The Comprehensive History of Secret Communication from Ancient Times to the Internet*, Publisher: unkown; 1967.

Kahn, *The Codebreakers: The First Comprehensive History of Secret Communication from Ancient Times to the Threshold of Outer Space*, Publisher: unknown, 1967.

Kahn, *The Codebreakers: The Story of Secret Writing*, Weidenfeld and Nicolson, 1967, pp. 1–10.

Kaliski, Jr. et al., *Is the Data Encryption Standard a Group?*, Journal of Cryptology, v.1, 1988, pp. 3–36.

Kranakis, *Primality and Cryptoprahy*, Wiley–Teubner, Section 4.1, 1986.

Kent, *Encryption Based Protection Protocols for Interactive User Communication, MIT/LCS/TR–162*, May 1976.

Lu, *Random Ciphering Bounds on a Class of Secrecy System and Discrete Message Sources*, IEEE Transactions on Information Theory, v.25, No. 4, Jul. 1979.

Matyas et al., *Generation, distribution and installation of cryptographic keys*, IBM Systems Journal 17, No. 2, 1978, pp. 126–137.

Meyer et al., *Cryptography: A New Dimension in Computer Data Security: A Guide for the Design and Implementation of Secure Systems*, John Wiley & Sons, 1982.

Meyer, *Enciphering Data for Secure Transmission*, Computer Design, Apr. 1974; pp. 129–134.

Mjolsnes, *A Simple Technique for Diffusing Cryptoperiods*, Div. of Computer Science and Telematics ELAB–RUNIT, The Norwegian Institute of Technology, N–7034, *Advances in Cryptology—EUROCRYPT '89, Workshop on the Theory and Application of Cryptographic Techniques*, Houthalen, Belgium, Apr. 10–23.

Orceyre et al., *An Approach to Secure Voice Communication Based on Data Encryption Standard*, Communications Magazine, IEEEv. 16, issue 6, Nov. 1978; pp. 41–50.

Payne et al., *Orderly Enumeration of Nonsingular Binary Matrices Applied to Text Encryption*, Communications of the ACM, v.21, issue 4, Apr. 1978, pp. 259–263.

Proctor, *A Self–Synchronizing Cascaded Cipher System with Dynamic Control of Error Propagation*, Proceedings of CRYPTO 84 on Advances in Cryptology, 1985; pp. 174–192.

Repa, *Naïve cipher, with questions*, sci.crypt Newsgroup, available at http://groups.google.com/sci.crypt/browse_frm/month/1987–09, Sep. 18, 1987.

Rosati, *A High Speed Data Encryption Processor for Public Key Cryptography*, IEEE Customs Integrated Circuits Conference, 1989.

Savage, *Some Simple Self–Synchronizing Digital Data Scramblers*, The Bell System Technical Journal, Feb. 1967, pp. 449–487.

Shannon, *Communication Theory of Secrecy Systems*, Bell System Technical Journal 28, Oct. 31, 1949; pp. 656–715.

Simmons, *Symmetric and Asymmetric Encryption*, Sandia Laboratories, Albuquerque, New Mexico, Computing Surveys, v.11, No. 4, Dec. 1979.

Jones, *New Encryption System Increases Data Security*, Gale Group, Mar. 1991; pp. 1.

Vernam, *Cipher Printing Telegraph Systems for Secret Wire and Radio Telegraphic Communications*, Journal of the IEEE, v. 55, Feb. 1926.

Voydock et al., *Security Mechanisms in High–Level Network Protocols*, ACM Computing Surveys, v.15, 1983; pp. 135–171.

Wagner, *Using Algorithms as Keys in Stream Ciphers*, Drexel University, Mathematics and Computer Science, Philadephia, PA 19104; Publisher; unknown, 1986, pp. 149–155.

Wagner et al., *Encrypted Database Design: Specialized Approaches*, 1986 IEEE Symposium on Security and Privacy, 1986; pp. 148–153.

Diffie & Hellman, "Privacy & Authentication: An Introduction to Cryptography," Proceedings of the IEEE, vol. 67, No. 3, Mar. 1979, pp. 397–427.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-2 is confirmed.

New claims 3-10 are added and determined to be patentable.

3. *The method of claim 1, further comprising:*
   *at said transmitter, associating with each of a plurality of remote locations with which secured communication is required different seed values, and*
   *wherein said provided seed value is one of said different seed values.*
4. *The method of claim 3, further comprising:*
   *storing the different seed values indexed by remote location.*
5. *The method of claim 1, wherein said provided seed value is one of a number of different seed values indexed by destination for a plurality of remote locations with which secure communication is required.*
6. *The method of claim 1, wherein said provided seed value is one of a number of different seed values for a plurality of remote locations with which secure communication is required.*
7. *The method of claim 1, further comprising:*
   *selecting the seed value from a number of different seed values for a plurality of remote locations with which secure communication is required.*
8. *The method of claim 1, further comprising:*
   *associating different ones of seed values with each of a plurality of remote locations with which secured communication is required.*
9. *The method of any one of claims 3, 4, 5, 6, 7, or 8, further comprising:*
   *adding error control information to the data sent over said link, wherein the error control information is added prior to transmitting the data over said link.*
10. *The method of claim 9, further comprising:*
    *compressing the data prior to encrypting the data.*

\* \* \* \* \*